United States Patent [19]

Heintzelman

[11] 4,036,615

[45] July 19, 1977

[54] MIST SEPARATOR

[76] Inventor: Leo Heintzelman, 4990 Burlingame, Wyoming, Mich. 49509

[21] Appl. No.: 613,494

[22] Filed: Sept. 15, 1975

[51] Int. Cl.² .................................................. B01D 45/08
[52] U.S. Cl. ........................................ 55/442; 55/462; 55/466; 55/DIG. 14; 55/186; 55/DIG. 23
[58] Field of Search ................. 55/185, 186, 423, 462, 55/464, 465, DIG. 23, 434, 442, DIG. 22, 443, 431, 466, DIG. 14, 445, 446

[56] References Cited

U.S. PATENT DOCUMENTS

| 520,604 | 5/1894 | Mellin | 55/DIG. 23 |
|---|---|---|---|
| 579,377 | 3/1897 | Baum | 55/464 |
| 617,480 | 1/1899 | De Rycre | 55/442 |
| 711,446 | 10/1902 | Thacker | 55/464 |

FOREIGN PATENT DOCUMENTS

| 419,933 | 1/1911 | France | 55/442 |
|---|---|---|---|
| 134,674 | 7/1901 | Germany | 55/442 |

*Primary Examiner*—Frank W. Lutter
*Assistant Examiner*—David L. Lacey

*Attorney, Agent, or Firm*—Gordon W. Hueschen

[57] ABSTRACT

This invention relates to water removal or separator which can remove droplets of water suspended in the air as mist, and can separate the mist from the air to change and to transform "wet-air" into "dry-air." More particularly this invention relates to such devices which have a housing with baffles. The "wet-air" enters the housing from an inlet or orifice and strikes the baffles, and through the action of evaporation and surface friction the air sheds the water droplets onto the baffles. The water thus condensed on the baffles then drops and collects in the floor of the housing wherefrom it may be drained to the atmosphere through a small opening or an exhaust nozzle. To promote the removal of the water from the housing, through the assist of the air entering the housing, the baffles may be slightly curved or arcuate in configuraion so that as the air strikes them it is diverted downwardly where by slight air pressure thus created the water in the floor of the housing is expelled from the housing without too much air being used and wasted in the process.

6 Claims, 5 Drawing Figures

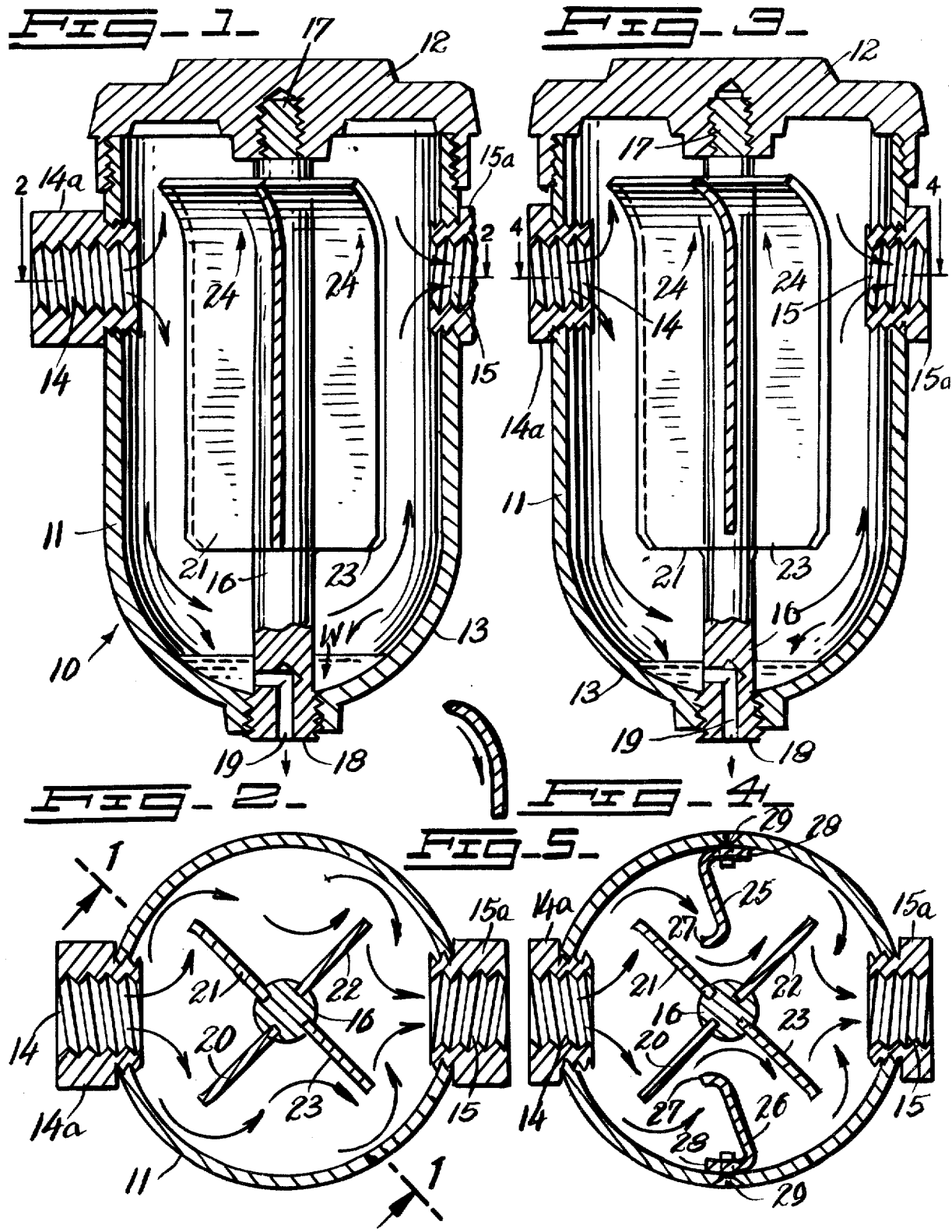

MIST SEPARATOR

This Invention relates to a mist separator. Such a device may comprise a cylindrical housing closed at both ends and provided with flat or curved baffles on which the mist of the air condenses. There is an inlet orifice or opening and an outlet opening in the body of the housing. Through the entry opening "wet-air" enters the device while it leaves as "dry-air" through the exhaust opening. In some special applications the intake opening or orifice may be larger in diameter than the exhaust opening but generally both intake and exhaust openings may be of the same diameter.

Inside the cylindrical housing or the body stem stands the housing there is a vertical stem which by means of threaded portions located on top and the bottom is threaded into the cover and the floor, respectively, of the housing. On the vertical stem there are mounted a number of flat or curved baffles. At the bottom of the stem (which is threaded into the floor of the housing) there is a water exhaust port or a nozzle of small diameter. With both ends of the stem held tight, the stem upright and stationary inside the housing.

Such a mist separator may be, for instance, installed in an automobile carburator. Filtered air from the automobile air cleaner is fed into the intake orifice in the housing. This filtered but moisture-laded air strikes the baffles, and by this action, the moisture in the air is removed to form "dry-air." The "dry-air" then is sucked or pulled by the vacuum into the carburator of the automobile engine to promote better mixture of the air-fuel combination, and to improve gas combustion.

Because the air intake orifice or entry opening may be somewhat larger in diameter than the exhaust opening, there will always be enough air entering the hollow body of the device even though some of the air will be lost in the process when the water is being expelled from the nozzle in the bottom of the vertical stem. The baffle plates on top may be slightly curved toward the inlet. Because of the curvature of each baffle, air flowing into the housing is diverted downwardly. This action assures that the water is removed from the housing, forced to leave out through the exhaust nozzle in the bottom of the stem by the pressure or the force of the intake air. The water exhaust orifice in the nozzle is of a diameter to insure the flow of water from the housing, yet small enough so that an excessive amount of air is not lost in the process of expelling water through the nozzle in the housing.

One object of the present invention is to provide a mist separator which is inexpensive to manufacture, and easy to install in a conventional type automobile.

Another object of this invention is to provide baffles on which the moisture laden air settles and sheds its water contents, and means for exhausting the water from the device with the minimum loss of air.

Another object of the present invention is to provide arcuate baffle plates which will divert the flow of air downwardly, against the pool of water collected in the floor of the housing, and by means of a small exhaust nozzle expel the water to the atmosphere.

This invention also contains certain other features of construction and the combination and arrangement of several parts to be hereinafter fully described, illustrated in the accompanying drawings, and in the specifications and more especially pointed out in the appended claims.

In describing the invention in detail, references will be had to the accompanying drawings where like character numerals denote like and corresponding parts throughout the several views in which:

FIG. 1 is a vertical cross-section through the device showing the embodiment of the present invention, and more particularly taken on the line 1—1 in FIG. 2;

FIG. 2 is a cross-section through the housing, taken on the line 2—2 of FIG. 1;

FIG. 3 is a modification showing a cross-section through the device;

FIG. 4 is a section taken on the line 4—4 of FIG. 3, and

FIG. 5 is an end view of one of the arcuate baffle plates in the device.

Referring more particularly to the embodiment of the present invention, better shown in FIG. 1, index numeral 10 indicates the general configuration of the housing, which in general, may consist of a cylindrical body 11, having a cover 12, and a half-spherical-shaped bottom or floor section 13. At the upper end thereof the housing 11 has an intake orifice or a threaded opening 14, and a threaded exhaust opening 15. The openings 14 and 15, respectively, are formed by the hubs 14a and 15a, respectively, which are threaded in the body of the housing 10, substantially as indicated.

Inside the housing shell 11 there is an upright stem 16 which at the top has a threaded end 17, and a similar threaded end 18 at the lower end. The threaded end 18 may be provided with an exhaust opening or an exhaust nozzle 19. It can be discerned that the four baffle plates 20, 21, 22, and 23, respectively, in the housing 11, may be curved at the top or the upper ends 24. Baffle plate 21 forms an acute angle with the axis of opening 14 in a direction clockwise from said axis and baffle plate 20 forms an acute angle on the opposite side of the axis from baffle plate 21. There are only four baffle plates shown but there can be provided more than four baffles, or a lesser number than four, if necessary. Arrows in FIG. 2 indicate the path which the moisture-laden air takes to pass through the baffles. The air strikes the baffles to help remove its water contents held in it in the form of mist. The water collects at the well "W" formed in the bottom of the housing 11, at 13, and then by pressure air is expelled through the exhaust nozzle 19. The pressure is formed by the air which is diverted downwardly by the curvature in the baffle plates.

In the modification shown in FIGS. 3 and 4, respectively, it may be discerned that the design of this particular water separator is very much similar to the one shown in FIGS. 1 and 2. However, in the latter case there are provided a pair (two or more) additional baffles 25 and 26 which can be mounted not on the stem 16 but directly against the inside wall of the housing 11, as shown in FIG. 4. These baffles may be of substantial length and can be formed so as to provide an arcuate edge 27, and a flat extension 28 which are affixed by means of two or more screws 29 to the inside wall of the housing 11 (see FIG. 4 for details).

Having described my invention what I claim as novel and original is the following:

1. A mist separator comprising a cylindrical housing having a bottom and a cover so as to form a hollow-shaped vessel said housing having an inlet opening in one side and an outlet opening in an opposite side thereof and baffle plates positioned therebetween, said baffle plates extending radially across the diameter of said housing but terminating short of the walls thereof and axially from a point above and adjacent said inlet opening spaced from said cover to a point substantially below said inlet opening and spaced from said bottom and a water discharge nozzle in the bottom of said housing, a portion of said baffle plates extending above said inlet opening being curved downwardly toward the discharge nozzle to direct the flow of air downwardly, said bottom being closed except for said nozzle, and said nozzle being small relative to said inlet opening and being open to the atmosphere whereby a portion of the downwardly directed air acts to help expel the separated water through said water discharge nozzle.

2. The mist separator of Claim 1 further comprising additional stationary baffle plates extending radially inward from the inside wall of said housing to a point intermediate adjacent ones of said first recited baffle plates to help remove moisture from the air and turn the "wet-air" to "dry-air."

3. The mist separator of Claim 2, in which the inner edges of said additional baffle plates are slightly curved toward the inlet opening.

4. The mist separator of claim 1, in which said baffle plates comprise a first baffle plate which forms an acute angle with the axis of said inlet opening in a direction clockwise from said axis and a second baffle plate which forms an acute angle with said axis on the opposite side of said axis from said first baffle plate.

5. The mist separator of claim 4, further including additional stationary baffle plates extend radially inward from the inside wall of said housing so as to deflect the air after it passes the first and second baffle plates.

6. The mist separator of claim 5, in which the inner edges of said additional baffle plates are slightly curved toward the inlet opening.

* * * * *